Feb. 8, 1938.　　　　F. HONIG　　　　2,107,735
CRINKLED SHEET RUBBER AND PROCESS AND APPARATUS FOR MAKING THE SAME
Filed Dec. 6, 1935
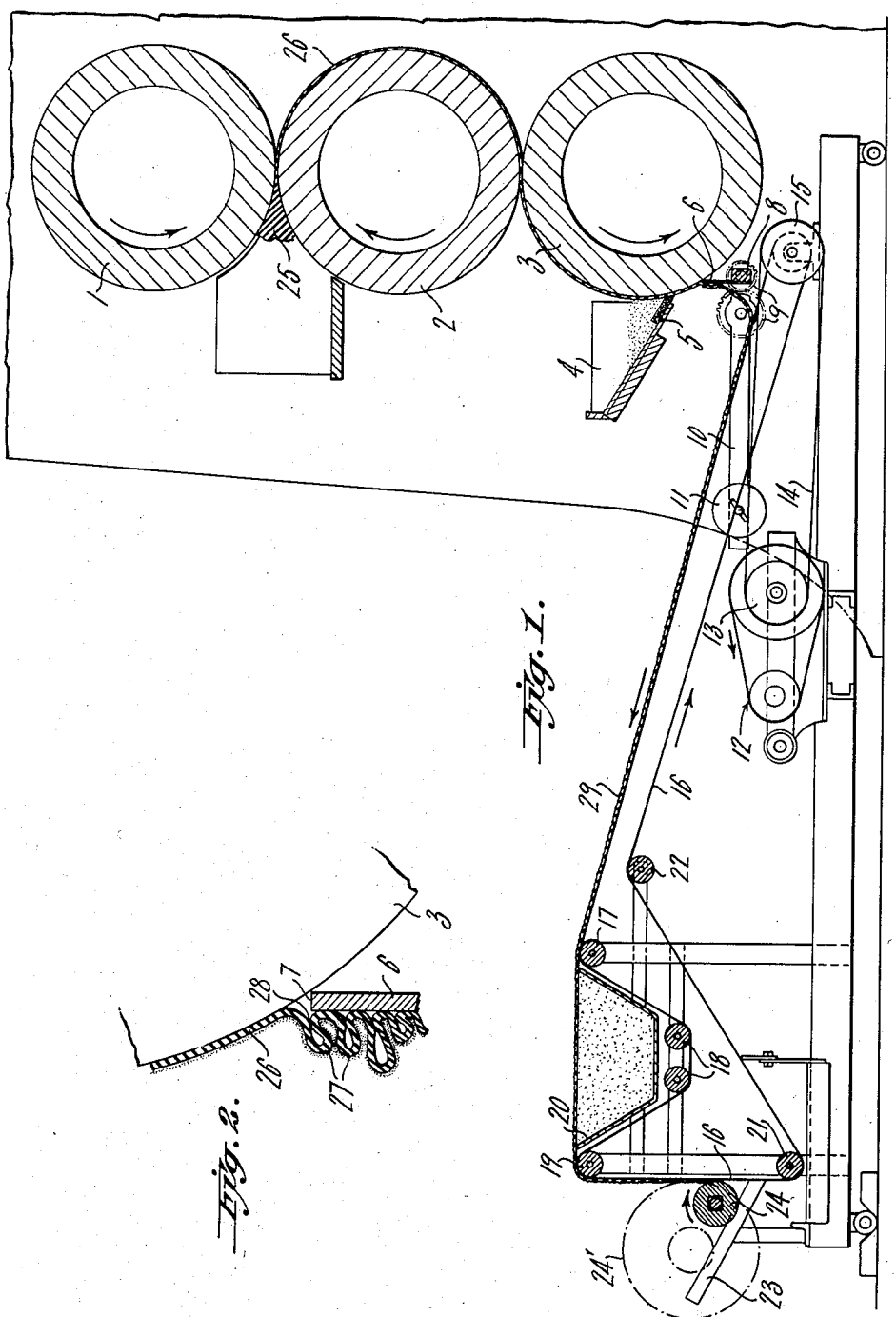
INVENTOR.
FRANK HONIG
BY Walter L. Pipes
ATTORNEY.

Patented Feb. 8, 1938

2,107,735

UNITED STATES PATENT OFFICE 2,107,735

CRINKLED SHEET RUBBER AND PROCESS AND APPARATUS FOR MAKING THE SAME

Frank Honig, Pawtucket, R. I., assignor to United States Rubber Products, Inc., New York, N. Y., a corporation of Delaware Application December 6, 1935, Serial No. 53,153

14 Claims. (Cl. 154—33)

This invention relates to a novel and ornamental crinkled sheet rubber and to a process and apparatus for making the same, and more particularly to a single ply crinkled rubber material.

Crinkled rubber sheet material, either single or multiple ply, has come into extensive use for the manufacture of bathing suits, caps and shoes, aprons, and many other sheet rubber articles. By reason of lightness, elasticity, water shedding properties and wide color range, such material has attained a deservedly great popularity in the trade.

An object of the present invention is to provide a novel, ornamental and strong single ply crinkled sheet rubber material.

Another object is to provide a process for making the material.

Still another object is to provide an apparatus capable of carrying out the process.

Further objects will appear from the detailed description and drawing, in which latter:

Fig. 1 is a broken away vertical section through one suitable form of apparatus for carrying out the process, and Fig. 2 is a detail view.

While the invention is capable of being carried out on various forms of apparatus, a particularly suitable form is the ordinary three roll calender together with certain later to be described attachments, which attachments may be removed when desired, thus enabling the calender to be used for other purposes.

The apparatus as shown consists of a calender having an upper roll 1, an intermediate roll 2 and a bottom roll 3. Adjacent the bottom roll is arranged a powder container 4 having one side wall open adjacent the calender roll, and having a felt strip 5 disposed on its inclined bottom wall adjacent the roll. Slightly below the powder container is disposed a sheet separating and crinkling blade 6, which preferably has a blunt free end 7 (Fig. 2) adapted to yieldingly contact with the polished surface of the calender roll 3. The blade 6 is mounted on a pivot bar 8, which latter through the gear connections 9 may be turned on its pivot by the lever 10 carrying the adjustable weight 11. Upon downward movement of the lever 10 the gear connections 9 actuate the pivotally mounted bar 8 to yieldingly force the separating blade 6 against the calender roll 3, and by varying the position of the weight 11 on the lever 10 the pressure can be suitably adjusted.

At 12 is shown a common form of variable speed drive, such as the Reeves drive, which through the pulley 13 and belt 14 drives the main pulley 15 of a conveyor 16. This conveyor is so disposed that its lower right hand end is in position to receive the crinkled rubber sheet as discharged from the calender, and the upper run of the conveyor then passes over the idler roll 17, then downwardly around the depressed idler rolls 18 and upwardly over the idler roll 19. Disposed within the depressed portion of the conveyor is a powder container 20. The return run of the conveyor passes from the idler roll 19 substantially vertically downwardly, under the roll 21, over the roll 22, and back to the drive pulley 15. Adjacent the downwardly extending portion of the conveyor between rolls 19 and 21 is an inclined support 23 upon which may rest the wind-up spindle 24 for the crinkled rubber stock.

In carrying out the process the calender rolls are warmed and a warm bank 25 of plastic rubber stock is placed between the bite of the rolls 1 and 2, so that after passing between these rolls the rubber stock is formed into a relatively thin and easily deformed sheet 26 which passes around the roll 2 and then backwardly between the rolls 2 and 3, thence downwardly on the roll 3. Due to its somewhat tacky and warm condition the sheet adheres to the roll 3, but by reason of the polished surface of the roll the adherence is slight, and the sheet can be readily removed. In its downward passage on the roll 3 it moves through the exposed end of the powder container 4, which is filled with a suitable dusting material such as talc or starch, and the lower felt strip 5 applies an even coating of the powder to the free face of the sheet 26.

Slightly below the powder container 4 the sheet engages the blunt end 7 of the separating blade 6 as shown in detail in Fig. 2. This blade may be set at any suitable angle to the calender roll 3 but preferably this angle should be considerably less than a right angle. As the slightly adherent warm sheet 26 on roll 3 engages the end of blade 7, it is separated from the roll and forced into crinkles or folds 27 somewhat as diagrammatically shown in Fig. 2. In the finished material it is desired that the crinkles on the outer face be substantially free from each other, and in order to secure this result the powder is applied to the free face of the sheet 26 prior to the action of the separating blade, hence the adjoining walls of the crinkles on the outer face will not in general adhere to each other. However, on the inner face of the sheet which was adhered to the roll 3, the tacky nature of the warm plastic rubber stock will cause adjacent wall surfaces of the crinkles to adhere, as indicated at 28 in Fig. 2.

Upon separation and crinkling of the calendered stock it passes on to the conveyor 16, and the crinkled sheet 29 passes upwardly until it reaches the powder container 20, where the conveyor is passed beneath the container, while the crinkled sheet passes across the top of the container. This container is kept continuously filled with sufficient powdering material to engage the lower face of the crinkled sheet 29 and thereby remove its tackiness so that the sheet may be reeled up. The thus powdered sheet 29 again meets the conveyor 16 adjacent the pulley 19 and passes vertically downward and is wound up on the spindle 24 by reason of the frictional action of the downwardly moving conveyor 16. As the size of the wind-up reel of stock increases, it moves outwardly on the inclined support 23, as shown in dot and dash lines at 24'.

By means of the variable speed control mechanism 12, the speed of the conveyor 16 may be readily adjusted relatively to that of the calender, and in this manner the character and degree of crinkling be controlled. If the conveyor be set to run somewhat slowly with respect to the calender, the crinkling tends to be larger or more extreme, while on the other hand if the speed of the conveyor be increased sufficiently to place a slight tension on the stock, the degree of crinkling is correspondingly reduced.

The crinkling produced in the stock by the above process and apparatus is highly irregular over the entire extent of the stock, the crinkles in general being of a somewhat arcuate form and extending in the same general direction, but varying greatly in height, thickness and length. Some of the crinkles may extend continuously and laterally across the sheet for a considerable distance, while others may be relatively short. Sometimes a crinkle may separate into two independent crinkles. The general effect is highly ornamental.

The material may be either vulcanized in sheet form and then assembled into articles as by the use of cement, or instead and preferably, the unvulcanized crinkled material may be assembled into articles by cut-seaming processes in which the edges of parts are simultaneously cut and seamed together, the unvulcanized and plastic nature of the stock readily permitting this operation. This method of assembly is preferred because the unused scrap, being unvulcanized, can be remilled and used over again. The stock may be vulcanized by the use of the sulphur chloride cure, either in vapor form or in dilute solution, or instead the stock may be compounded with vulcanizing ingredients and given a heat cure. It is preferred when a heat cure is used to employ a modern high power accelerator capable of causing vulcanization at reduced temperatures.

While the invention has been described as applied to unvulcanized rubber, it is obvious that various other rubber-like and synthetic or substitute rubber materials may be used in plastic form in carrying out the process, and the term "rubber" without qualification is intended to cover such materials.

Obviously in carrying out the process the sheet rubber stocks employed should be of sufficient thinness and plasticity to be readily deformed in forcing the sheet stock up into a crinkled form, and also the stock should have sufficient tackiness to readily adhere, in forming the crinkles, at the bottom side of the material where it is desired to unite the walls of the crinkles. The character of the rubber stock and suitable compounding procedure can be readily determined by those skilled in the art. A suitable thickness of the calendered stock before crinkling is about .010".

While a specific form of the process and apparatus have above been set forth, it is obvious that they may be modified without departing from the spirit of the invention, and it is not desired to limit the claims otherwise than as required by the prior art.

Having thus described my invention, what I claim and desire to protect by Letters Patent is:

1. The method of making crinkled sheet rubber which comprises temporarily adhering a relatively thin and easily deformed sheet of plastic rubber to a support, forming crinkles in the sheet and adhering the adjacent walls of the crinkles together by progressively forcing portions of the sheet back upon itself and away from the support, the force being applied at an acute angle to the surface of the support while the sheet is progressively separated from the support.

2. The method of making a crinkled sheet rubber which comprises continuously but temporarily adhering a relatively thin and easily deformed sheet of plastic rubber to a smooth surfaced support, forming crinkles in the sheet and adhering together the adjacent walls of the crinkles by inserting a separating blade between the advance edge of the sheet and its support and at an angle of less than 90° to the surface of the support, and continuously relatively moving the adhered-sheet-and-support and the blade toward each other, whereby the sheet is crinkled as it is separated from the support.

3. The method of making a crinkled sheet rubber which comprises continuously but temporarily adhering a sheet of plastic rubber to a smooth surfaced support, applying powder to the free surface of the sheet, forming crinkles in the sheet and adhering together the adjacent walls of the crinkles opposite to the powdered surface by inserting a separating blade between the advance edge of the sheet and its support and at an angle of less than 90° to the surface of the support, and continuously advancing the adhered sheet and support against said blade, whereby the sheet is forced up into crinkles as it separates from its support.

4. The method of making a crinkled sheet rubber which comprises passing a plastic rubber sheet around a heated roll in adherence thereto, forming crinkles in the sheet and adhering together the adjacent walls of the crinkles by removing the adhering sheet of rubber from the moving roll with an angularly disposed separating blade engaging the surface of the roll beneath the rubber sheet, whereby the sheet as removed from the roll is forced up into a crinkled form.

5. The method of making a crinkled sheet rubber which comprises passing a plastic rubber sheet around a heated roll in adherence thereto, powdering the free surface of the adhering sheet, forming crinkles in the sheet and adhering together the adjacent walls of the crinkles opposite to the powdered surface by removing the sheet from the moving roll by an angularly disposed separating blade engaging the surface of the roll beneath the rubber sheet, whereby the sheet as removed from the roll is forced up into a crinkled form.

6. The method of making a crinkled sheet rubber which comprises forming a relatively thin sheet of warm, plastic rubber from a bank of stock on calender rolls, powdering the free surface of the sheet while still in adherence to the calender roll, and removing the powdered sheet from the moving roll by an angularly disposed separating blade engaging the surface of the roll beneath the rubber sheet, whereby the sheet as removed from the roll is forced up into a crinkled form.

7. The method of making a crinkled sheet rubber which comprises continuously but temporarily adhering a relatively thin sheet of plastic rubber stock to a smooth surfaced support, inserting a separating blade between the advance edge of the sheet and its support and at an acute angle to the surface of the support, continuously advancing the sheet and support against said blade at a predetermined speed to thereby force the sheet to crinkle up as it is separated, removing the crinkled sheet on a moving support, and varying the degree of crinkling of the sheet by varying the relative speeds of the two supports.

8. The method of making a crinkled sheet rubber which comprises forming a relatively thin sheet of warm, plastic rubber from a bank of rubber on a calender, powdering the free face of the formed sheet, removing the powdered sheet from the discharge roll of the calender by a blunt edged separating blade disposed at an acute angle to and in contact with said roll, to thereby force the sheet to crinkle up, disposing the crinkled sheet on a conveyor, varying the degree of crinkling by varying the relative speeds of the calender and conveyor, and powdering the other face of the sheet.

9. As a new article of manufacture, a sheet of rubber, the material of which throughout its extent has been forced up into narrow crinkles or folds of varying length, width and height, said folds or crinkles in general being free of each other at one side of the material and having their inner wall surfaces adhesively united at the opposite side.

10. As a new article of manufacture, a single sheet of rubber, the material of which throughout its extent has been forced up into crinkles or folds of generally arcuate shape, said folds being of varying length, width and height, the inner wall surfaces of the folds being adhesively united at one side of the material.

11. As a new article of manufacture, a single sheet of rubber, the material of which throughout its extent has been forced up into wavy crinkles or folds extending in the same general direction, said folds varying in length, width and height, and the inner wall surfaces of the folds being adhesively united at one side of the material.

12. An apparatus for crinkling sheet rubber comprising a movable support having a smooth surface, means for supplying and adhering a continuous sheet of plastic rubber thereto, means for supplying powdered material to the free surface of said sheet, a separator blade adapted to engage said surface beyond said powder supplying means at an acuate angle to said surface, and means for advancing said support to bring said sheet into contact with said blade, to thereby separate the sheet from its support and force it into crinkles.

13. An apparatus for crinkling sheet rubber comprising a rotatable smooth roll, means for supplying and adhering a continuous relatively thin sheet of plastic rubber thereto, means for powdering the free face of said sheet, a separator blade disposed beyond the powdering means at an acute angle to the roll surface and with its free end disposed to enter between the moving sheet and roll and thereby separate and crinkle said sheet, means for removing the crinkled sheet, and means for varying the degree of crinkling.

14. An apparatus for crinkling sheet rubber comprising a calender for sheeting out plastic rubber stock, means adjacent the discharge roll of the calender for applying powder to the free face of the calendered sheet, a blunt edged separator blade disposed beyond the powder applying means at an acute angle to the surface of said discharge roll and with its free end disposed to enter between the moving sheet and roll and thereby separate and crinkle the sheet, a conveyor for removing the crinkled sheet, and means for varying the relative speeds of the calender and conveyor to thereby vary the degree of crinkling.

FRANK HONIG.